United States Patent
Yamamoto et al.

(10) Patent No.: US 10,400,835 B2
(45) Date of Patent: Sep. 3, 2019

(54) DUAL CLUTCH DEVICE

(71) Applicant: ISUZU MOTORS LIMITED, Tokyo (JP)

(72) Inventors: Yasushi Yamamoto, Fujisawa (JP); Koji Terashima, Fujisawa (JP); Shou Ozaki, Fujisawa (JP); Taku Honda, Fujisawa (JP); Toshitaka Minbu, Fujisawa (JP); Yusuke Takahashi, Fujisawa (JP); Tomoaki Shimozawa, Fujisawa (JP); Nobuyuki Iwao, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 284 days.

(21) Appl. No.: 15/304,832

(22) PCT Filed: Apr. 16, 2015

(86) PCT No.: PCT/JP2015/061733
§ 371 (c)(1),
(2) Date: Oct. 17, 2016

(87) PCT Pub. No.: WO2015/159955
PCT Pub. Date: Oct. 22, 2015

(65) Prior Publication Data
US 2017/0184160 A1    Jun. 29, 2017

(30) Foreign Application Priority Data

Apr. 18, 2014 (JP) .................................. 2014-086378

(51) Int. Cl.
*F16H 48/00* (2012.01)
*F16D 48/02* (2006.01)
*F16D 21/06* (2006.01)
*F16D 25/0638* (2006.01)
*F16D 25/10* (2006.01)

(52) U.S. Cl.
CPC ......... *F16D 48/0206* (2013.01); *F16D 21/06* (2013.01); *F16D 25/0638* (2013.01);
(Continued)

(58) Field of Classification Search
CPC ................. F16D 25/14; F16D 48/0206; F16D 2021/0661; F16D 25/0638
See application file for complete search history.

(56) References Cited

U.S. PATENT DOCUMENTS 5,232,418 A * 8/1993 Aoki ................... F16D 25/0638
                                                        192/48.61
6,705,175 B1    3/2004 Klatt
(Continued)

FOREIGN PATENT DOCUMENTS

CN          1498318 A       5/2004
DE     102004034540 A1      2/2006
(Continued)

OTHER PUBLICATIONS

Extended European Search Report for EP App No. 15779222.7 dated Dec. 4, 2017, 5 pgs.
(Continued)

*Primary Examiner* — Stacey A Fluhart
(74) *Attorney, Agent, or Firm* — Procopio, Cory, Hargreaves & Savitch LLP

(57) ABSTRACT

A dual clutch device includes a first piston applying a first clutch by a hydraulic pressure supplied into a first hydraulic pressure chamber and releasing the first clutch by a first spring, a second piston applying a second clutch by a hydraulic pressure supplied into a second hydraulic pressure chamber and releasing the second clutch by a second spring, a first supply line supplying a hydraulic pressure into the first hydraulic pressure chamber and a second hydraulic pressure canceling chamber, a second supply line supplying a hydrau-
(Continued)

lic pressure into the second hydraulic pressure chamber and a first hydraulic pressure canceling chamber, a first valve allowing or cutting the supply of hydraulic pressure into the first hydraulic pressure chamber and the second hydraulic pressure canceling chamber, and a second valve allowing or cutting the supply of hydraulic pressure into the second hydraulic pressure chamber and the first hydraulic pressure canceling chamber.

2 Claims, 4 Drawing Sheets

(52) U.S. Cl.
CPC ............. *F16D 25/10* (2013.01); *F16D 25/14* (2013.01); *F16D 2021/0653* (2013.01); *F16D 2021/0661* (2013.01); *F16D 2048/0275* (2013.01); *F16D 2500/5104* (2013.01)

(56) References Cited

U.S. PATENT DOCUMENTS

| | | | |
|---|---|---|---|
| 2004/0121872 A1 | 6/2004 | Eymuller et al. | |
| 2010/0051408 A1 | 3/2010 | Ulbricht et al. | |
| 2010/0162840 A1 | 7/2010 | Gitt | |
| 2011/0233022 A1* | 9/2011 | Fujimoto | F16D 25/10 192/48.601 |
| 2012/0199434 A1* | 8/2012 | Asatsuke | F16D 21/04 192/48.601 |
| 2013/0075221 A1 | 3/2013 | Nogle | |
| 2016/0178018 A1* | 6/2016 | Margraf | F16D 25/0638 192/85.63 |

FOREIGN PATENT DOCUMENTS

| | | |
|---|---|---|
| DE | 102006054032 A1 | 5/2008 |
| DE | 102012222472 A1 | 6/2013 |
| EP | 1067319 B2 | 1/2008 |
| JP | 2004-036807 A | 2/2004 |
| JP | 2010-531417 A | 9/2010 |
| JP | 2013-024331 A | 2/2013 |

OTHER PUBLICATIONS

International Search Report and Written Opinion for PCT App No. PCT/JP2015/061733 dated Jun. 30, 2015, 9 pgs.
Office Action for related Chinese Application No. 201580020026.5, dated May 3, 2018; English translation provided; 10 pages.

* cited by examiner

DUAL CLUTCH DEVICE

CROSS-REFERENCE TO RELATED APPLICATIONS

This application is a U.S. National Stage entry of PCT Application No. PCT/JP2015/061733, filed on Apr. 16, 2015, which claims priority to JP Application No. 2014-086378 filed Apr. 18, 2014. The contents of the foregoing are incorporated by reference.

TECHNICAL FIELD

The present invention relates to a dual clutch device.

BACKGROUND ART

Conventionally, there have been known dual clutch transmissions including a first input shaft connected to a first clutch that is configured to connect and disconnect the transmission of power from an engine and a second input shaft connected to a second clutch that is configured to connect and disconnect the transmission of power from the engine and configured to change a gear ratio by applying the first clutch and the second clutch alternately (for example, refer to Patent Literature 1).

In a general dual clutch transmission, one clutch corresponds to an odd-numbered gear train and the other clutch to an even-numbered gear train. Owing to this, for example, when effecting an upshift from the second to third gear, the third speed synchromesh mechanism is engaged with the clutch for the even-numbered gear train applied and the second speed synchromesh mechanism engaged. Then, the clutch for the odd-numbered gear train is applied while releasing the clutch for the even-numbered gear train, whereby the change of the gear ratio can be realized without the occurrence of torque loss.

CITATION LIST

Patent Literature

Patent Literature 1: JP-A-2010-531417

SUMMARY OF INVENTION

Technical Problem

In a general dual clutch device, when applying a clutch, a hydraulic pressure is supplied into a hydraulic pressure chamber, and a hydraulic pressure is released from a hydraulic pressure canceling chamber, causing a piston to move one stroke to bring clutch plates into press contact with one another, whereby the desired application of the clutch is realized. On the contrary, when releasing the clutch, the hydraulic pressure in the hydraulic pressure chamber is released, allowing a return spring in the hydraulic pressure canceling chamber to move the piston away from the clutch plates, whereby the desired release of the clutch is realized. Supplying the hydraulic pressure to the hydraulic pressure chamber or releasing the hydraulic pressure from the hydraulic pressure chamber is controlled by switching on or off solenoid valves provided for the hydraulic pressure chambers.

Owing to this, for example, in the event that at least one of the solenoid valves fails due to disconnection or sticking, the corresponding clutch is held applied, leading to a risk of triggering a double meshing of the transmission.

An object of the invention is to provide a dual clutch device which can prevent effectively the double meshing of a transmission.

Means for Solving the Problem

Solution to Problem

In order to achieve the above object, a dual clutch device comprises a first clutch comprising a first plate for connecting and disconnecting the transmission of power from an engine to a first transmission input shaft and a second clutch comprising a second plate for connecting and disconnecting the transmission of power from the engine to a second transmission input shaft, the dual clutch device characterized by comprising: a first piston configured to apply the first clutch by pressing the first plate by means of a hydraulic pressure supplied into a first hydraulic pressure chamber and release the first clutch by being moved away from the first plate by a first spring accommodated in a first hydraulic pressure canceling chamber; a second piston configured to apply the second clutch by pressing the second plate by means of a hydraulic pressure supplied into a second hydraulic pressure chamber and release the second clutch by being moved away from the second plate by a second spring accommodated in a second hydraulic pressure canceling chamber; a first supply line for supplying a hydraulic pressure into the first hydraulic pressure chamber and the second hydraulic pressure canceling chamber; a second supply line for supplying a hydraulic pressure into the second hydraulic pressure chamber and the first hydraulic pressure canceling chamber; a first opening-closing valve, which is provided on the first supply line, and which is configured to allow or cut off the supply of a hydraulic pressure into the first hydraulic pressure chamber and the second hydraulic pressure canceling chamber; and a second opening-closing valve, which is provided on the second supply line, and which is configured to allow or cut off the supply of a hydraulic pressure into the second hydraulic pressure chamber and the first hydraulic pressure canceling chamber.

It may be preferable that a biasing force of the first spring is set greater than a difference between a hydraulic pressure that is supplied into the first hydraulic pressure chamber via the first supply line to be applied on the first piston and a hydraulic pressure that is supplied into the first hydraulic pressure canceling chamber via the second supply line to be applied to the first piston.

It may be preferable that a biasing force of the second spring is set greater than a difference between a hydraulic pressure that is supplied into the second hydraulic pressure chamber via the second supply line to be applied on the second piston and a hydraulic pressure that is supplied into the second hydraulic pressure canceling chamber via the first supply line to be applied to the second piston.

DESCRIPTION OF EMBODIMENTS

Figure 1:
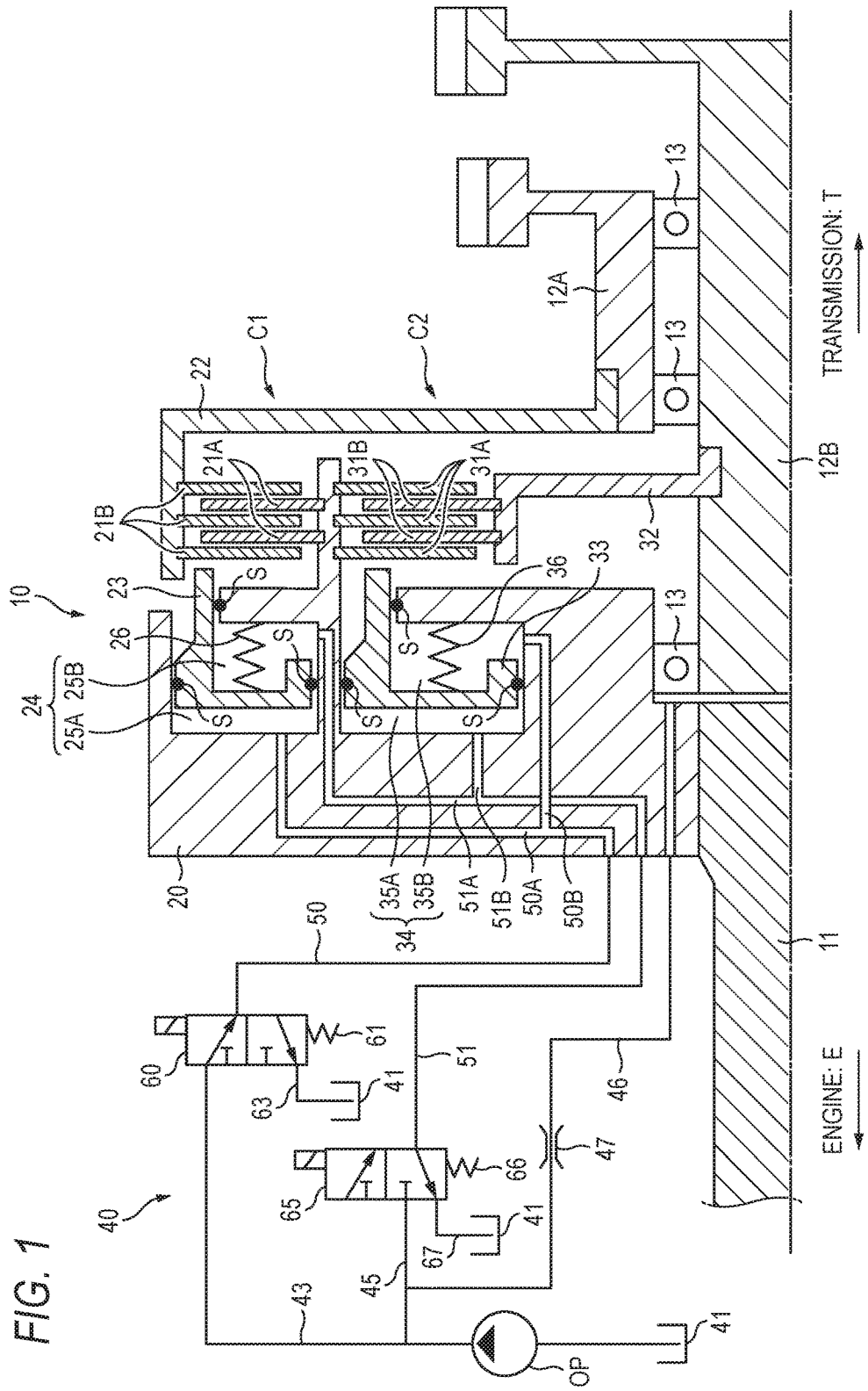
FIG. 1 is a schematic vertical longitudinal sectional view showing an upper half of a dual clutch device according an embodiment of the invention.

Hereinafter, a dual clutch device according to an embodiment of the invention will be described based on the accompanying drawings. Like reference numerals are given to like component parts, and this will also be true with names and functions. Consequently, the detailed description of those constituent components will not be repeated in the description.

As shown in FIG. 1, a dual clutch device 10 includes a first wet-type clutch C1 and a second wet-type clutch C2. Reference numeral 11 denotes a clutch input shaft into which power of an engine E is transmitted. Reference numeral 12A denotes a first transmission input shaft on which a speed change gear train which establishes, for example, odd-numbered gears of a transmission T is provided, and reference numeral 12B denotes a second transmission input shaft on which a speed change gear train which establishes, for example, even-numbered gears is provided. The second input shaft 12B is supported rotatably via bearings 13 within a hollow shaft of the first input shaft 12A.

The first wet-type clutch C1 includes a clutch hub 20 which rotates together with the clutch input shaft 11, a plurality of first inner plates 21A which are spline fitted in the clutch hub 20, a first clutch drum 22 which rotates together with the first transmission input shaft 12A, a plurality of first outer plates 21B which are disposed alternately between the first inner plates 21A and which are spline fitted in the first clutch drum 22 and a first cylindrical piston 23 which can press both the plates 21A, 21B together in an axial direction.

The first piston 23 is accommodated slidably within a first annular piston chamber 24 which is defined within the clutch hub 20. In this first piston chamber 24, a first hydraulic pressure chamber 25A and a first centrifugal hydraulic pressure canceling chamber 25B are defined by the first piston 23. A first return spring 26, which is configured to bias the first piston 23 in a direction in which the first piston 23 moves away from the plates 21A, 21B, is accommodated within the first centrifugal hydraulic pressure canceling chamber 25B. Reference sign S denotes a seal member which seals up a gap between the first piston 23 and the first piston chamber 24.

When a hydraulic pressure is supplied into the first hydraulic pressure chamber 25A, the first piston 23 moves one stroke in the axial direction to thereby bring the plates 21A, 21B into press contact with one another (the first wet-type clutch C1: applied). On the other hand, when the hydraulic pressure within the first hydraulic pressure chamber 25A decreases and a hydraulic pressure is supplied into the first centrifugal hydraulic pressure canceling chamber 25B, the first piston 23 is caused to move away from the plates 21A, 21B by means of a biasing force of the first return spring 26 and a hydraulic pressure force within the first centrifugal hydraulic pressure canceling chamber 25B to thereby release the plates 21A, 21B from the press contact state (the first wet-type clutch C1: released).

The second wet-type clutch C2 includes a plurality of second outer plates 31A which are spline fitted in the clutch hub 20, a second clutch drum 32 which rotates together with the second transmission input shaft 12B, a plurality of second inner plates 31B which are disposed alternately between the second outer plates 31A and which are spline fitted in the second clutch drum 32, and a second cylindrical piston 33 which can press and contact both the plates 31A, 31B together in the axial direction.

The second piston 33 is accommodated slidably within a second annular piston chamber 34 which is defined within the clutch hub 20, In this second piston chamber 34, a second hydraulic pressure chamber 35A and a second centrifugal hydraulic pressure canceling chamber 35B are defined by the second piston 33. A second return spring 36, which is configured to bias the second piston 33 in a direction in which the second piston 33 moves away from the plates 31A, 31B, is accommodated within the second centrifugal hydraulic pressure canceling chamber 35B. Reference sign S denotes a seal member which seals up a gap between the second piston 33 and the second piston chamber 34.

When a hydraulic pressure is supplied into the second hydraulic pressure chamber 35A, the second piston 33 moves one stroke in the axial direction to thereby bring the plates 31A, 31B into press contact with one another (the second wet-type clutch C2: applied). On the other hand, when the hydraulic pressure within the second hydraulic pressure chamber 35A decreases and a hydraulic pressure is supplied into the second centrifugal hydraulic pressure canceling chamber 35B, the second piston 33 is caused to move away from the plates 31A, 31B by means of a biasing force of the second return spring 36 and a hydraulic pressure within the second centrifugal hydraulic pressure canceling chamber 35B to thereby release the plates 31A, 31B from the press contact state (the second wet-type clutch C2: released).

A hydraulic pressure circuit 40 has a first upstream supply line 43 which connects an oil pan 41 to a first solenoid valve 60 and a second upstream supply line 45 which branches off the first upstream supply line 43 to be connected to a second solenoid valve 65. An oil pump OP, which is driven by the power of the engine E, is provided on a portion of the first upstream supply line 43 which lies upstream of the branch portion. A lubrication oil supply line 46 on which a throttle valve 47 is provided is connected to the second upstream supply line 45.

A first downstream supply line 50 is connected to the first solenoid valve 60. This first downstream supply line 50 branches into a first hydraulic pressure chamber line 50A and a second canceling chamber line 50B within the clutch hub 20. A downstream end of the first hydraulic pressure chamber line 50A is connected to the first hydraulic pressure chamber 25A, and a downstream end of the second canceling chamber line 50B is connected to the second centrifugal hydraulic pressure canceling chamber 35B.

The first solenoid valve 60 is closed by means of a biasing force of a spring 61 when it is deenergized (OFF) and is energized (ON) to be opened by an electronic control unit, not shown. A hydraulic pressure is supplied into the first hydraulic pressure chamber 25A and the second centrifugal hydraulic pressure canceling chamber 35B when the first solenoid valve 60 is opened (ON). On the other hand, when the first solenoid valve 60 is closed (OFF), no hydraulic pressure is supplied into the first hydraulic pressure chamber 25A and the second centrifugal hydraulic pressure canceling chamber 35B, and the hydraulic pressures within the first hydraulic pressure chamber 25A and the second centrifugal hydraulic pressure canceling chamber 35B are returned to the oil pan 41 via a fluid return line 62.

A second downstream supply line 51 is connected to a second solenoid valve 65. This second downstream supply line 51 branches into a second hydraulic pressure chamber line 51A and a first canceling chamber line 51B within the clutch hub 20. A downstream end of the second hydraulic pressure chamber line 51A is connected to the second hydraulic pressure chamber 35A, and a downstream end of the first canceling chamber line 51B is connected to the first centrifugal hydraulic pressure canceling chamber 25B.

The second solenoid valve 65 is closed by means of a biasing force of a spring 66 when the second solenoid valve 65 is deenergized (OFF) and is energized (ON) to be opened by the electronic control unit. When the second solenoid valve 65 is opened (ON), a hydraulic pressure is supplied into the second hydraulic pressure chamber 35A and the first centrifugal hydraulic pressure canceling chamber 25B. On the other hand, when the second solenoid valve 65 is closed (OFF), no hydraulic pressure is supplied into the second hydraulic pressure chamber 35A and the first centrifugal hydraulic pressure canceling chamber 25B, and the hydraulic pressures in the second hydraulic pressure chamber 35A and the first centrifugal hydraulic pressure canceling chamber 25B are returned to the oil pan 41 via a fluid return line 67.

Next, the application and release of the dual clutch device 10 and the working effect thereof will be described based on FIGS. 2, 3.

Figure 2:
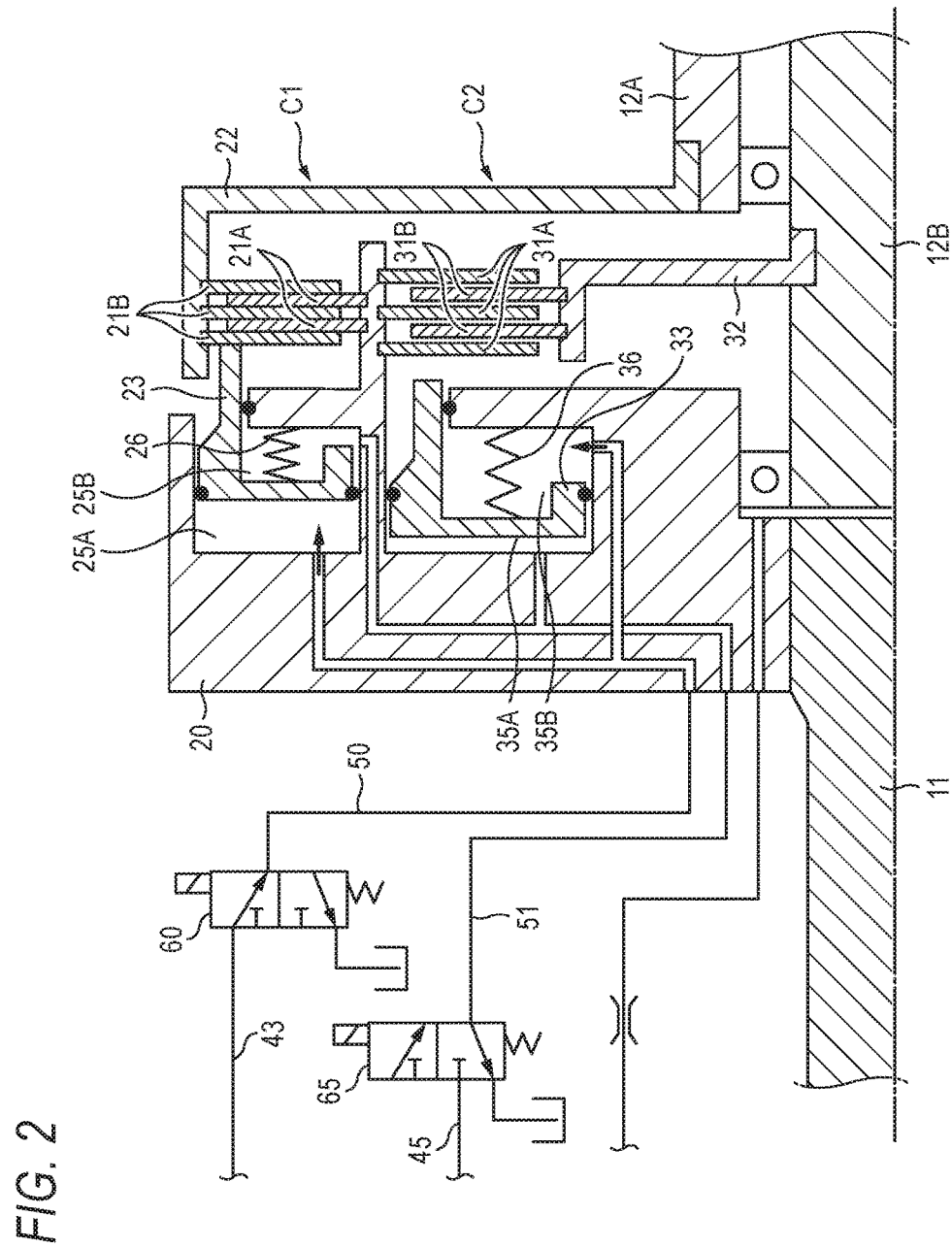
FIG. 2 is a diagram illustrating a state in which a first wet type clutch is applied while a second wet type clutch is released in the dual clutch device according to the embodiment of the invention.

When transmitting power from the clutch input shaft 11 to the first transmission input shaft 12A, as shown in FIG. 2, the first wet-type clutch C1 is applied (the first solenoid valve 60: ON) and the second wet-type clutch C2 is released (the second solenoid valve 65: OFF).

When the first solenoid valve 60 is ON, since a hydraulic pressure is supplied not only to the first hydraulic pressure chamber 25A but also to the second centrifugal hydraulic pressure canceling chamber 35B, both the biasing force of the second return spring 36 and the hydraulic pressure within the second centrifugal hydraulic pressure canceling chamber 35B are applied to the second piston 33. As a result, for example, even though a failure such as disconnection or sticking is caused in the second solenoid valve 65, the second piston 33 can be moved away from the plates 31A, 31B in an ensured manner, thereby making it possible to prevent a double meshing of the transmission in an ensured manner.

Figure 3:
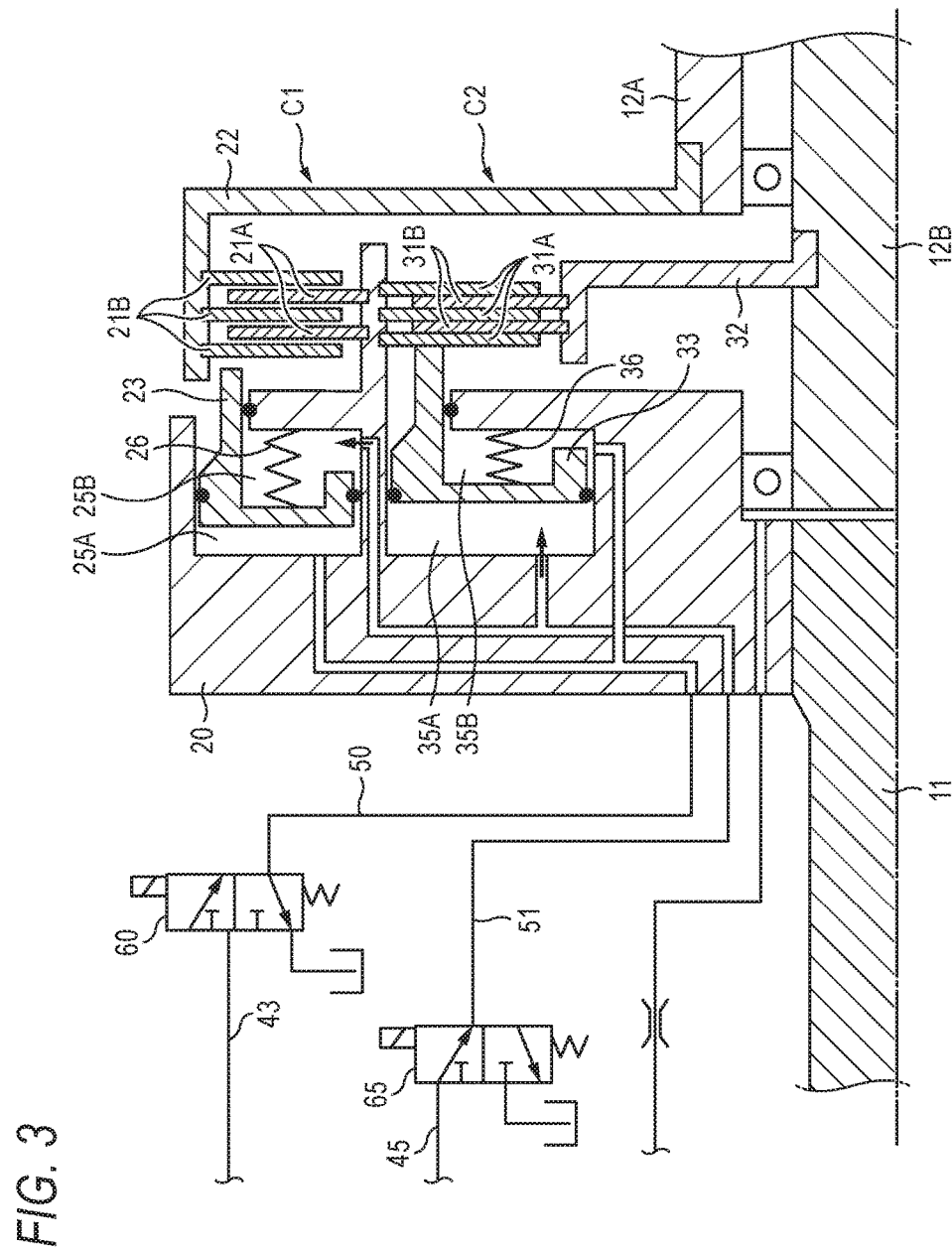
FIG. 3 is a diagram illustrating a state in which the first wet type clutch is released while the second wet type clutch is applied in the dual clutch device according to the embodiment of the invention.

When transmitting power from the clutch input shaft 11 to the second transmission input shaft 12B, as shown in FIG. 3, the first wet-type clutch C1 is released (the first solenoid valve 60: OFF), and the second wet-type clutch C2 is applied (the second solenoid valve 65: ON).

When the second solenoid valve 65 is ON, since a hydraulic pressure is supplied not only to the second hydraulic pressure chamber 35A but also to the first centrifugal hydraulic pressure canceling chamber 25B, both the biasing force of the first return spring 26 and the hydraulic pressure within the first centrifugal hydraulic pressure canceling chamber 25B are applied to the first piston 23. As a result, for example, even though a failure such as disconnection or sticking is caused in the first solenoid valve 60, the first piston 23 can be moved away from the plates 21A, 21B in an ensured manner, thereby making it possible to prevent a double meshing of the transmission in an ensured manner.

Next, how to set an optimal biasing force for the return springs 26, 36 will be described based on FIG. 4.

Figure 4:
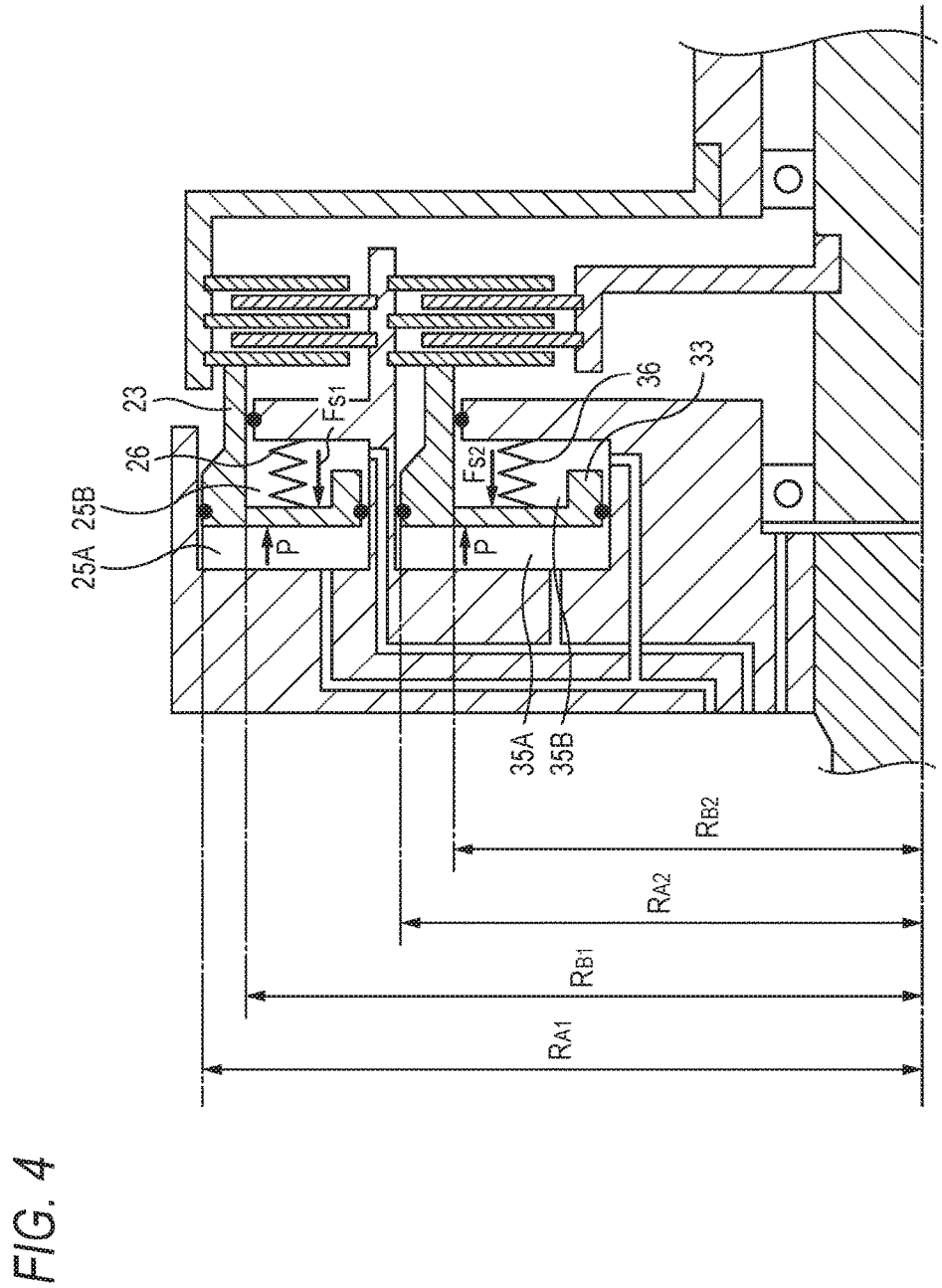
FIG. 4 is a diagram illustrating hydraulic pressures applied to pistons and biasing forces of return springs in the dual clutch device according to the embodiment of the invention.

In FIG. 4, $R_{A1}$ denotes an outside diameter of the first piston 23, $R_{B1}$ an outside diameter of the first centrifugal hydraulic pressure canceling chamber 25B, $R_{A2}$ an outside diameter of the second piston 33, $R_{B2}$ an outside diameter of the second centrifugal hydraulic pressure canceling chamber 35B, P a hydraulic pressure, $F_{S1}$ a biasing force of the first return spring 26, and $F_{S2}$ a biasing force of the second return spring 36. When these satisfy the following conditional expressions (1), (2), even though both the first and second solenoid valves 60, 65 are switched ON at the same time, the first and second wet-type clutches C1, C2 can be released in an ensured manner.

$$(R_{A1}^2 - R_{B1}^2) \cdot P\pi < F_{S1} \quad \text{[Expression 1]}$$

$$(R_{A2}^2 - R_{B2}^2) \cdot P\pi < F_{S2} \quad \text{[Expression 2]}$$

In this way, by setting the biasing force of the first return spring 26 greater than a difference in hydraulic pressure between a force which is generated by a hydraulic pressure of the first hydraulic pressure chamber 25A and applied to the first piston 23 and a force which is generated by a hydraulic pressure of the first centrifugal hydraulic pressure canceling chamber 25B and applied to the first piston 23 and setting the biasing force of the second return spring 36 greater than a difference in hydraulic pressure between a force which is generated by a hydraulic pressure of the second hydraulic pressure chamber 35A and applied to the second piston 33 and a force which is generated by a hydraulic pressure of the second centrifugal hydraulic pressure canceling chamber 35B and applied to the second piston 33, the first and second wet-type clutches C1, C2 are released in an ensured manner, thereby making it possible to prevent effectively the occurrence of a double meshing of the transmission.

The invention is not limited to the embodiment described heretofore but can be carried out by making modifications thereto as required without departing from the spirit and scope of the invention.

The invention claimed is:

1. A dual clutch device comprising:
   a first clutch comprising a first plate for connecting and disconnecting the transmission of power from an engine to a first transmission input shaft;
   a second clutch comprising a second plate for connecting and disconnecting the transmission of power from the engine to a second transmission input shaft;
   a first piston configured to apply the first clutch by pressing the first plate by means of a force which is generated by a hydraulic pressure supplied into a first hydraulic pressure chamber and release the first clutch by being moved away from the first plate by a biasing force of a first spring accommodated in a first hydraulic pressure canceling chamber;
   a second piston configured to apply the second clutch by pressing the second plate by means of a force which is generated by a hydraulic pressure supplied into a second hydraulic pressure chamber and release the second clutch by being moved away from the second plate by a biasing force of a second spring accommodated in a second hydraulic pressure canceling chamber;
   a first supply line for supplying a hydraulic pressure into the first hydraulic pressure chamber and the second hydraulic pressure canceling chamber;
   a second supply line for supplying a hydraulic pressure into the second hydraulic pressure chamber and the first hydraulic pressure canceling chamber;

a first opening-closing valve provided on the first supply line, the first opening-closing valve being configured to allow or cut off the supply of a hydraulic pressure into the first hydraulic pressure chamber and the second hydraulic pressure canceling chamber; and a second opening-closing valve provided on the second supply line, the second opening-closing valve being configured to allow or cut off the supply of a hydraulic pressure into the second hydraulic pressure chamber and the first hydraulic pressure canceling chamber, wherein the biasing force of the first spring is set greater than a difference between a force which is generated by a hydraulic pressure that is supplied into the first hydraulic pressure chamber via the first supply line to be applied on the first piston and a force which is generated by a hydraulic pressure that is supplied into the first hydraulic pressure canceling chamber via the second supply line to be applied to the first piston.

2. The dual clutch device according to claim 1, wherein the biasing force of the second spring is set greater than a difference between a force which is generated by a hydraulic pressure that is supplied into the second hydraulic pressure chamber via the second supply line to be applied on the second piston and a force which is generated by a hydraulic pressure that is supplied into the second hydraulic pressure canceling chamber via the first supply line to be applied to the second piston.

* * * * *